(12) United States Patent
Low et al.

(10) Patent No.: US 7,347,693 B2
(45) Date of Patent: Mar. 25, 2008

(54) APPARATUS AND METHOD FOR TEACHING AND REINFORCING POSITIVE BEHAVIOR

(76) Inventors: Diana Low, 3187 Meadow Brook Dr., Woodbury, MN (US) 55125; Scott Krentz, 118-1/2 N. Main St., Stillwater, MN (US) 55082

( * ) Notice: Subject to any disclaimer, the term of this patent is extended or adjusted under 35 U.S.C. 154(b) by 492 days.

(21) Appl. No.: 10/783,731

(22) Filed: Feb. 20, 2004
(Under 37 CFR 1.47)

(65) Prior Publication Data
US 2005/0183929 A1  Aug. 25, 2005

(51) Int. Cl.
*G09B 19/00* (2006.01)

(52) U.S. Cl. ..................................... 434/236
(58) Field of Classification Search ............... 434/236, 434/237, 238, 365, 370, 393; 194/247, 342, 194/343
See application file for complete search history.

(56) References Cited

U.S. PATENT DOCUMENTS

| | | | | |
|---|---|---|---|---|
| 5,288,233 A | * | 2/1994 | Green | 434/238 |
| 5,470,235 A | * | 11/1995 | Papaleo | 434/238 |
| 5,573,407 A | * | 11/1996 | Dunford | 434/262 |
| 5,639,242 A | * | 6/1997 | Wilson | 434/238 |
| 5,690,495 A | * | 11/1997 | Collier | 434/258 |
| 5,725,381 A | * | 3/1998 | Kollath et al. | 434/238 |
| 6,038,711 A | * | 3/2000 | Clarke | 4/449 |
| 6,550,774 B1 | * | 4/2003 | Stroll et al. | 273/447 |
| 6,572,380 B1 | | 6/2003 | Buckley et al. | |
| 6,722,886 B2 | * | 4/2004 | Blumberg | 434/236 |
| 7,137,820 B1 | * | 11/2006 | Scranton et al. | 434/258 |
| 2001/0034013 A1 | * | 10/2001 | Bennett | 434/238 |

OTHER PUBLICATIONS

"Treasure Tower", 2003 [retrieved online May 2, 2007].*

* cited by examiner

*Primary Examiner*—Kurt Fernstrom
(74) *Attorney, Agent, or Firm*—Haugen Law Firm PLLP

(57) ABSTRACT

A teaching and reinforcing method with a token receiving and article dispensing apparatus that dispenses an article in response to a token being fed into the apparatus. The apparatus includes a feed for feeding articles onto an article rest. A token inlet is located immediately in front of the article rest such that when a token is inserted into the token inlet the token pushes an article off the article rest. An article chute is disposed to the side of and below the article rest such that when an article is pushed off the article rest, the article falls into the article chute, out of an outlet, and out of the apparatus. A used token storage area is disposed generally below the article rest and above the outlet such that, upon the sliding removal of a floor of the token storage area, tokens fall out of the token storage area and into the article outlet and out of the apparatus. The method includes having a first person notice positive behavior of a second person and then having the first person give a token to the second person. The method further includes having the second person feed the token through the token inlet so as to receive a reward article.

1 Claim, 14 Drawing Sheets

APPARATUS AND METHOD FOR TEACHING AND REINFORCING POSITIVE BEHAVIOR

FIELD OF THE INVENTION

The present invention relates generally to a teaching and reinforcing apparatus and method, particularly to such an apparatus and method where the apparatus automatically returns a reward upon the deposit of a token, and specifically to such an apparatus and method where the method includes having a first person notice positive behavior by a second person, then having the first person give the second person a token for the positive behavior, then having the second person deposit the token in the apparatus which automatically returns a reward and where the dispenser of the apparatus includes no moving parts.

BACKGROUND OF THE INVENTION

Poor behavior is too often reinforced. For example, when children fight over which television program to watch, the mother in response may turn off the television and then send both children to their respective rooms for a timeout. They receive mom's attention (albeit negative attention) for their behavior (albeit negative behavior). Sooner rather than later, the situation is apt to repeat itself.

In perhaps a losing battle, psychologists have long sought means for changing behavior. Indeed, one means is a series of trips to the psychologist or psychiatrist herself. Other means are self help books, prison, yoga, war, and time itself.

SUMMARY OF THE INVENTION

Instead of changing behavior directly, the present invention seeks to "change" behavior naturally and slowly in an unobtrusive way over a period of time. The present invention does this by placing a burden upon a first person to recognize positive behavior. This then is the first step in the process.

Negative behavior is easy to perceive. Negative behavior is easy to see, to hear, to feel, and even to smell and taste. Negative behavior is too easy to miss. Recognition is simple.

On the other hand, positive behavior is easily missed. For example, the teacher did not call, so the homework was done, but father did not miss the teacher not calling, so the father did not say good job to the son. Examples are numerous.

Accordingly, a first step, the step of recognizing positive behavior, is most difficult. Somehow positive behavior must be perceived. Then, over time, positive behavior nudges out negative behavior and, alas, a person has "changed."

The present apparatus is a tool to remind family members to perceive positive behavior. Accordingly, it is preferable that the apparatus is aesthetic. With the present invention, the preferred aesthetic form of the apparatus is a treasure chest.

A treasure chest is a chest having a box portion and a lid portion. The box portion preferably includes a floor with four sidewalls extending outwardly and upwardly. The lid portion preferably includes an upper undulating surface. The preferred treasure chest has an operating keyhole.

The second step of the process is the step of having the first person, who recognized the positive behavior of the second person, give to the second person an object, preferably a token, for insertion into an apparatus that, in response to the inserted object, dispenses an article in reward for the positive behavior.

A feature of the invention is the provision in such an apparatus, of an article dispenser confronting a token inlet such that, when a token is inserted into the token inlet, the token pushes an article off the article rest and into an article outlet. The article rest or dispenser of the apparatus thereby has no moving parts and is hence inexpensive to manufacture.

Another feature of the present invention is the provision in such an apparatus, of the article rest or dispenser having a token slot in communication with the token inlet such that a token being inserted in the token inlet and pushing an article off the article rest may fall through the token slot formed in the article rest and fall into a token storage.

Another feature of the present invention is the provision in such an apparatus, of an article feed having an inclined portion to push articles under the influence of gravity in the direction of the article rest.

Another feature of the present invention is the provision in such an apparatus, of a token storage disposed generally below the article rest and generally above the article outlet such that used tokens fall by gravity into the token storage and subsequently, upon the moving of a floor of the token storage, into the article outlet.

Another feature of the present invention is the provision in such an apparatus, of the apparatus having a general storage, with said general storage being of sufficient size to hold a plurality of tokens and a plurality of articles.

Another feature of the present invention is the provision in such an apparatus, of the apparatus including the article itself and with the article comprising an openable container having an object therein.

Another feature of the present invention is the provision in such an apparatus, of the apparatus including the token itself and with the token having a visual indication associated with a portion of said apparatus adjacent to one slot.

Another feature of the present invention is the provision in such an apparatus, of the apparatus including the token itself and the article itself, with the token and the article having a visual indication associated with each other and further associated with a portion of the apparatus adjacent one slot.

Another feature of the present invention is the provision in such an apparatus, of an article dispenser for receiving an article to be dispensed, of a token inlet, and of a common outlet for the articles and tokens such that each of the articles and tokens are dispensable from the apparatus via the same outlet.

Another feature of the present invention is the provision in such an apparatus, of a first path along which articles are fed and dispensed and a second path along which tokens are fed and dispensed, with the paths intersecting at least once.

Another feature of the present invention is the provision in such an apparatus, of a first path along which articles are fed and dispensed and a second path along which tokens are fed and dispensed, with the paths intersecting at least twice.

Another feature of the present invention is the provision in such an apparatus, of the article feed having a lower portion feeding articles onto an article rest, of the article rest being disposed generally above an article outlet, of the token slot being disposed generally above the token storage, of the token storage being disposed generally above the article outlet, such that each of the articles and tokens run automatically via gravity through said apparatus.

Another feature of the present invention is the provision in such an apparatus, of the apparatus having a set of compartments, and of each of the compartments having an article feed, an article rest, a token inlet, a token storage, and an article outlet.

An advantage of the invention is that the dispenser mechanism of the apparatus has no moving parts. In other words, the article is pushed off the dispenser (or article rest or article ledge) by a token being pushed through the token inlet. The outgoing article (going out of the apparatus) then falls by gravity out of the apparatus. An incoming article (coming onto the dispenser or article rest or article ledge) then falls by gravity onto the dispenser or article rest or article ledge.

Another advantage of the invention is that the apparatus as a whole has a minimum of moving parts. A first moving part is a lockable lid. A second moving part is a feed tray having a set of article feeds. A third moving part is a slideable floor of a token storage space.

Another advantage of the invention is that the present apparatus is simple and inexpensive to manufacture. One feature contributing to this advantage is the placement of the article rest at the token inlet, thereby requiring no moving parts for the dispenser mechanism. A second feature contributing to this advantage is the gravitational path taken by the articles to and from the dispenser. A third feature contributing to this advantage is the gravitational path taken by the tokens between the token inlet and the common outlet shared by the tokens and the articles.

Another advantage of the invention is that the present apparatus is simple to operate. The apparatus is set up for operation by opening a lid, loading a feed tray that subsequently operates by gravity, and closing the lid. In operation, a token is inserted and an article falls out. To collect used tokens, a sliding door is unlocked and tokens fall out.

Another advantage of the invention is that the present apparatus associates a diameter of a token with a size of an article with a terminating portion of the article rest so as to make it difficult for a person to insert merely a portion of a token to push an article off the article rest such that the person then withdraws the token, whereby such person keeps his token and obtains an article. In other words, in the preferred embodiment, the article falls off the terminating portion of the article rest only upon the substantial complete insertion of a token into the token inlet so that a person cannot have his cake and eat it too. This substantial complete insertion occurs when an outer surface of the apparatus at the token inlet is tangential to the token such that a finger must push on the circumferential edge of the token to push the token a sufficient distance into the token inlet to push the article off the article rest. Such sufficient distance is a distance beyond a point of no return for the token, which almost simultaneously pushes the article off the article rest and falls through a token slot in the article rest to a token storage space.

IN THE DRAWINGS

DESCRIPTION OF THE PREFERRED EMBODIMENT

The present invention includes I) a token receiving and article dispensing apparatus that dispenses an article upon the receipt of a token; and II) a method for using the token receiving and article dispensing apparatus.

I. The Token Receiving and Article Dispensing Apparatus

Figure 1:
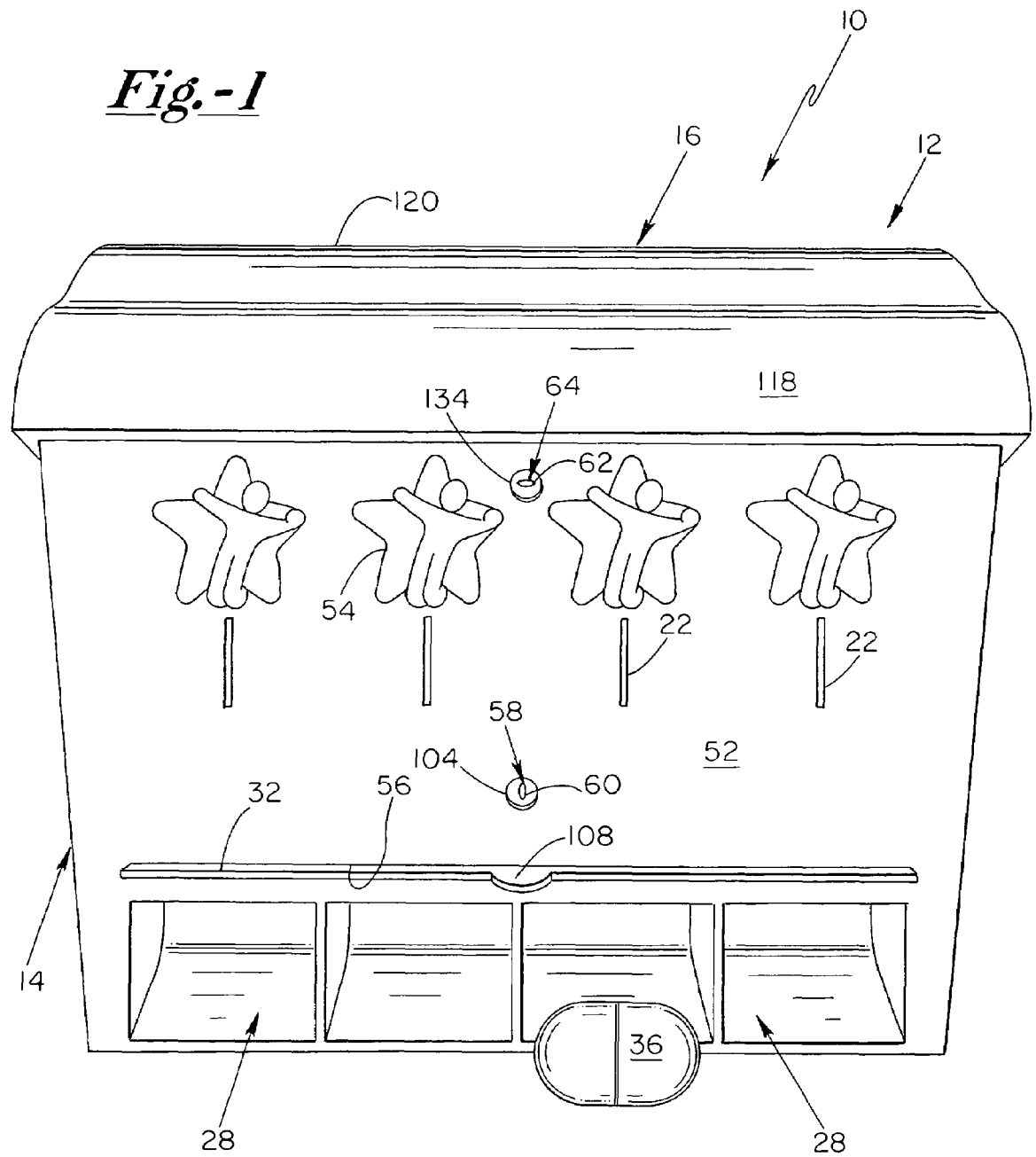
FIG. 1 is a front view of a token receiving and article dispensing apparatus of the present invention.
Figure 2:
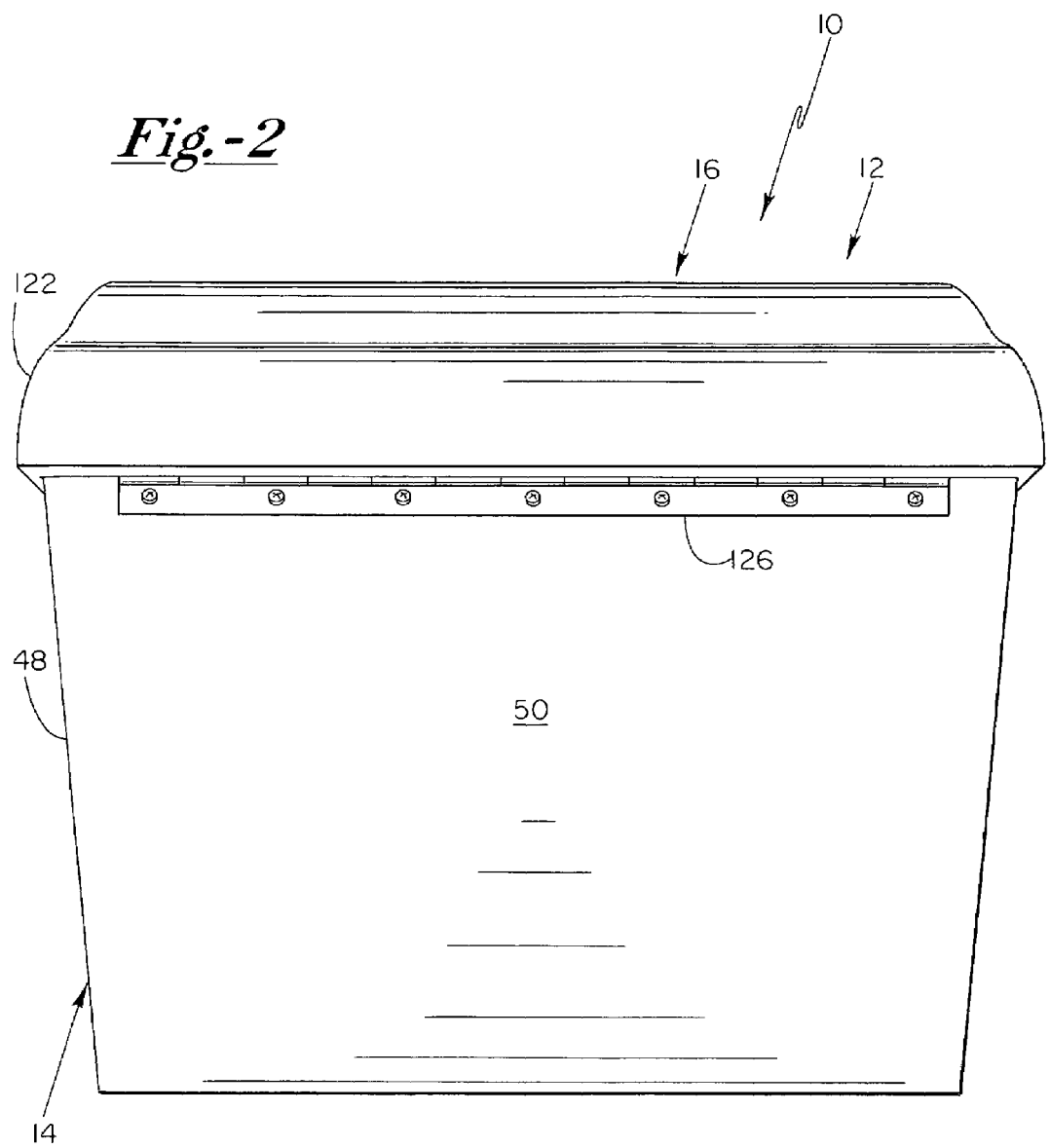
FIG. 2 is a rear view of the apparatus of FIG. 1.
Figure 3:
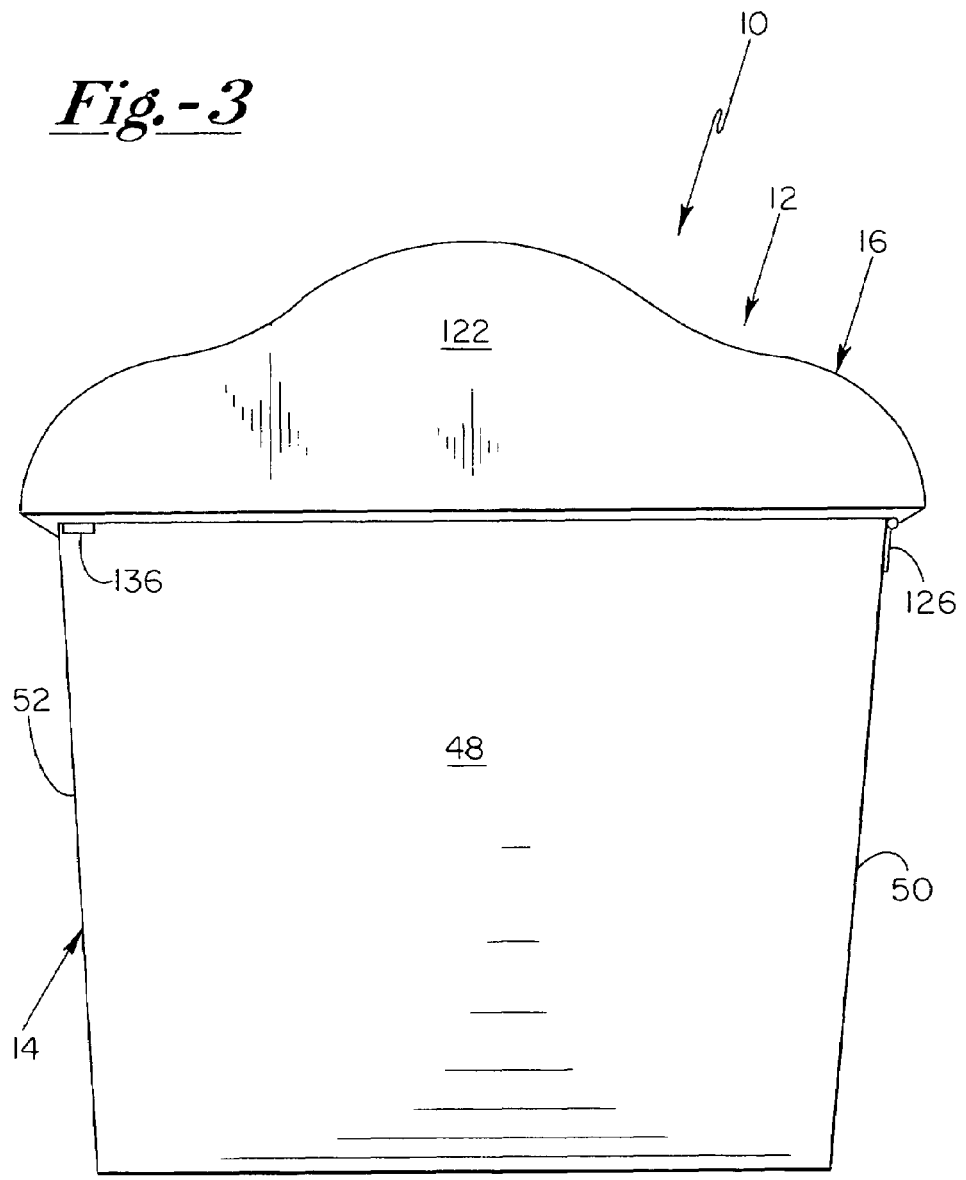
FIG. 3 is a left side view of the apparatus of FIG. 1.
Figure 4:
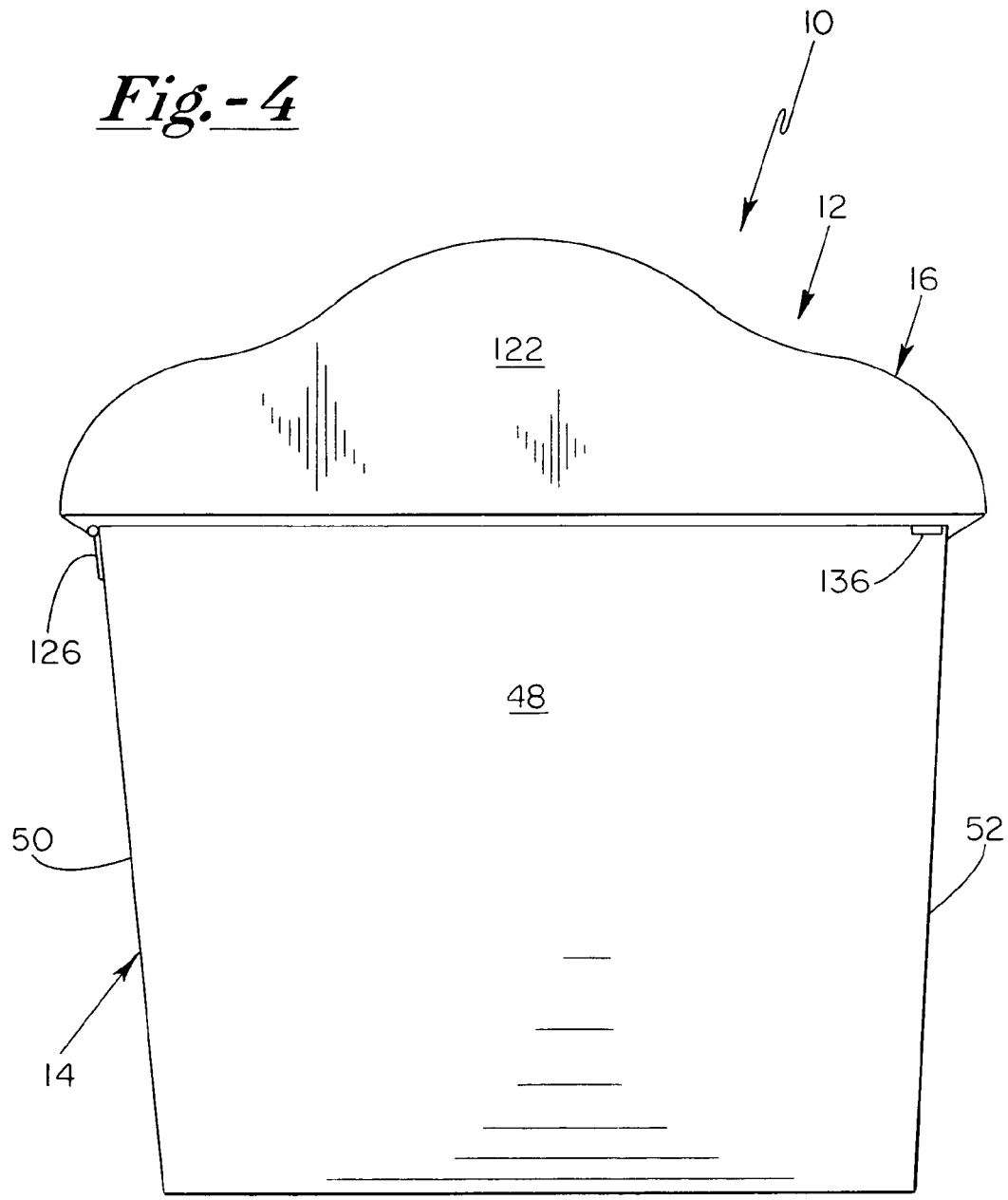
FIG. 4 is a right side view of the apparatus of FIG. 1.
Figure 5:
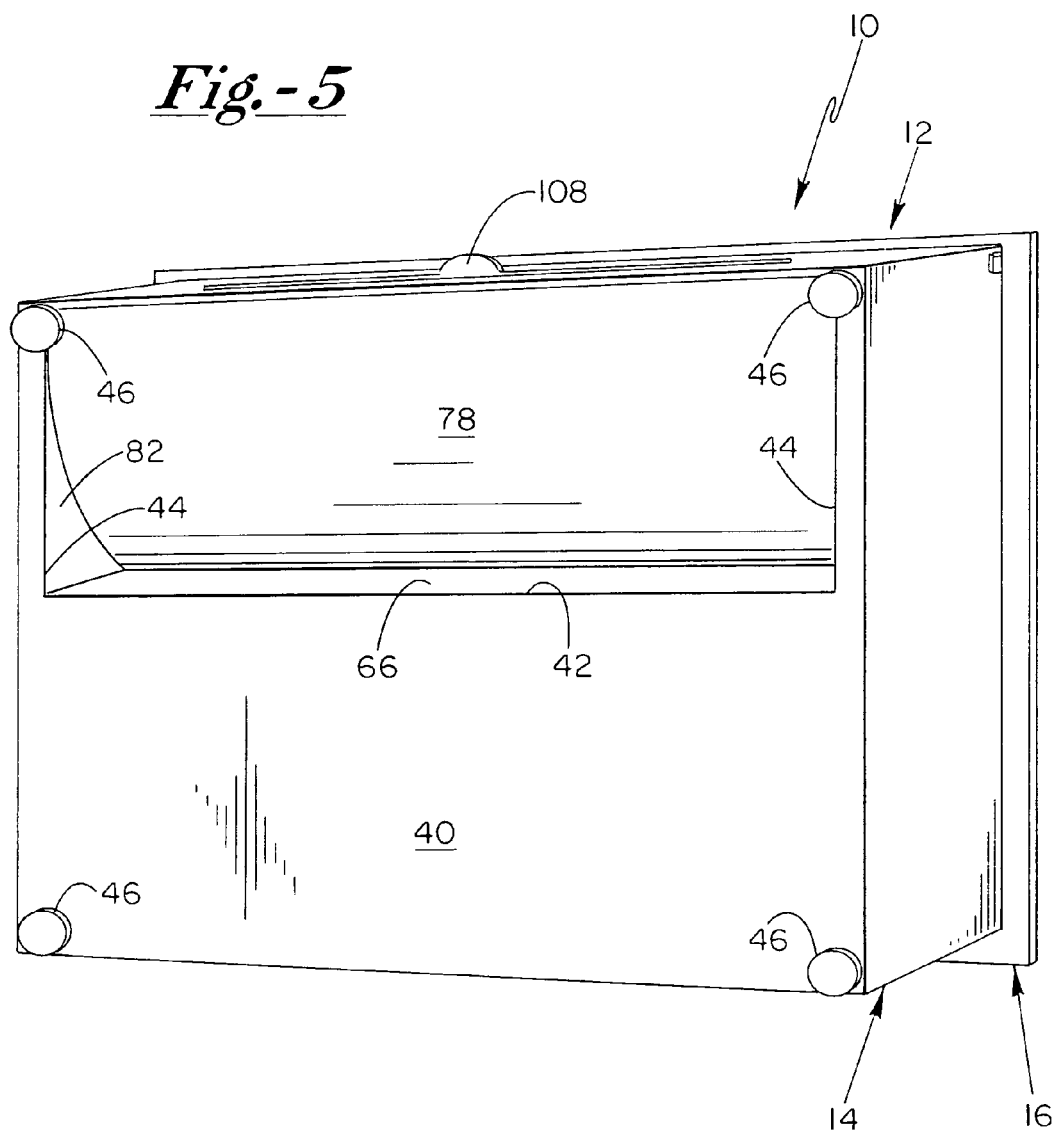
FIG. 5 is a bottom perspective view of the apparatus of FIG. 1.
Figure 6:
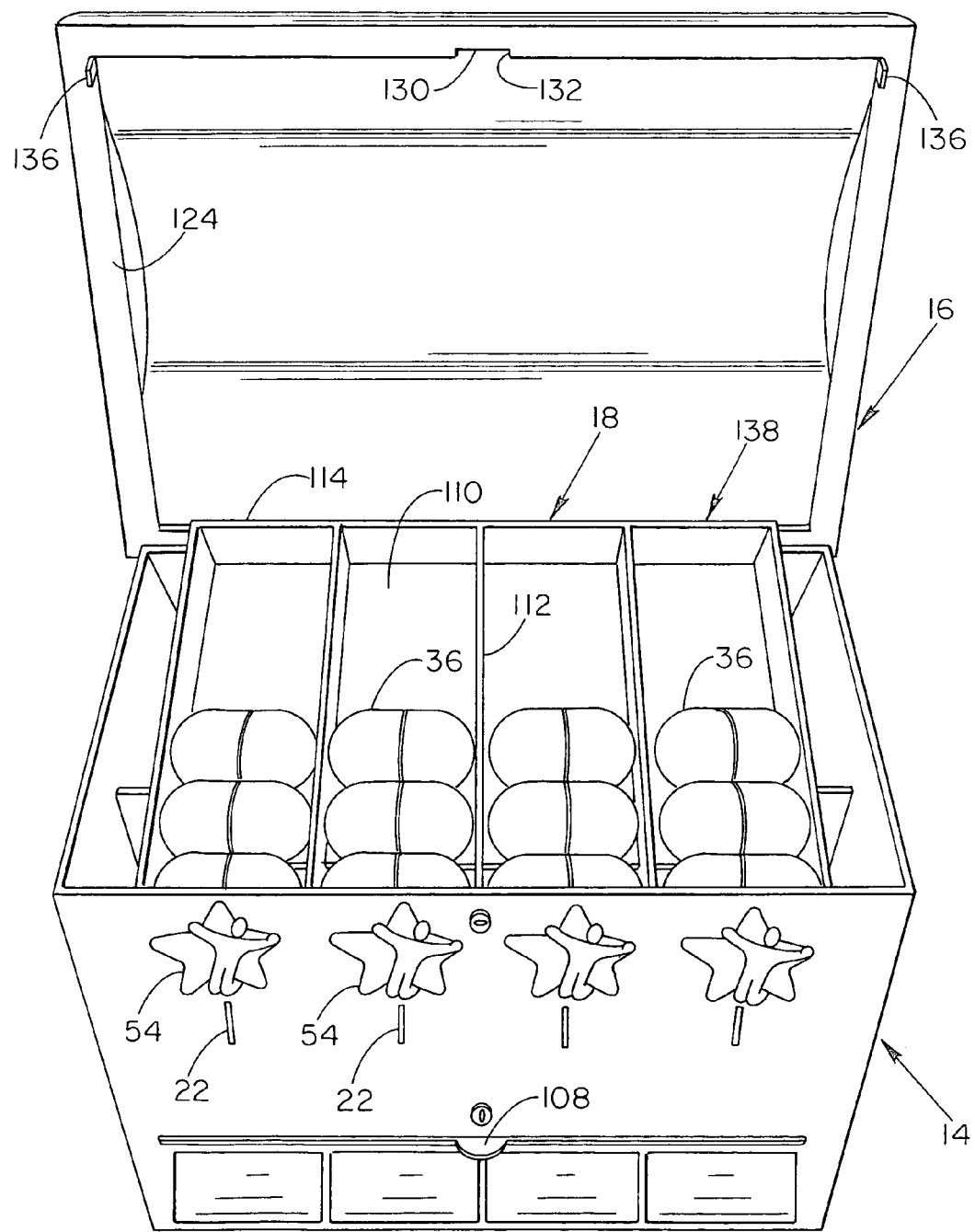
FIG. 6 is a front view of the apparatus of FIG. 1 with the lid of the apparatus in an open position.
Figure 7:
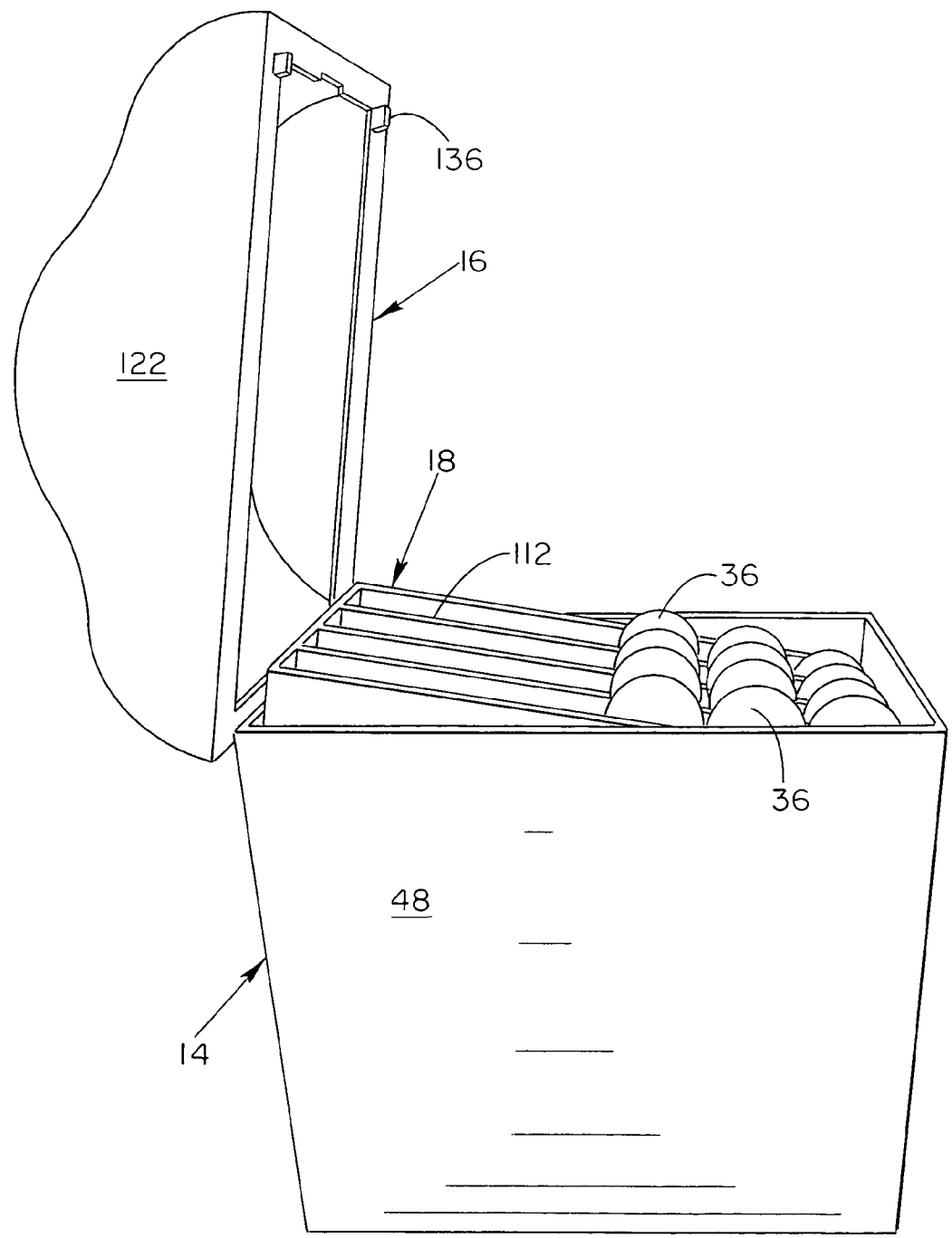
FIG. 7 is a right side view of the apparatus of FIG. 1 with the lid of the apparatus in an open position.
Figure 8:
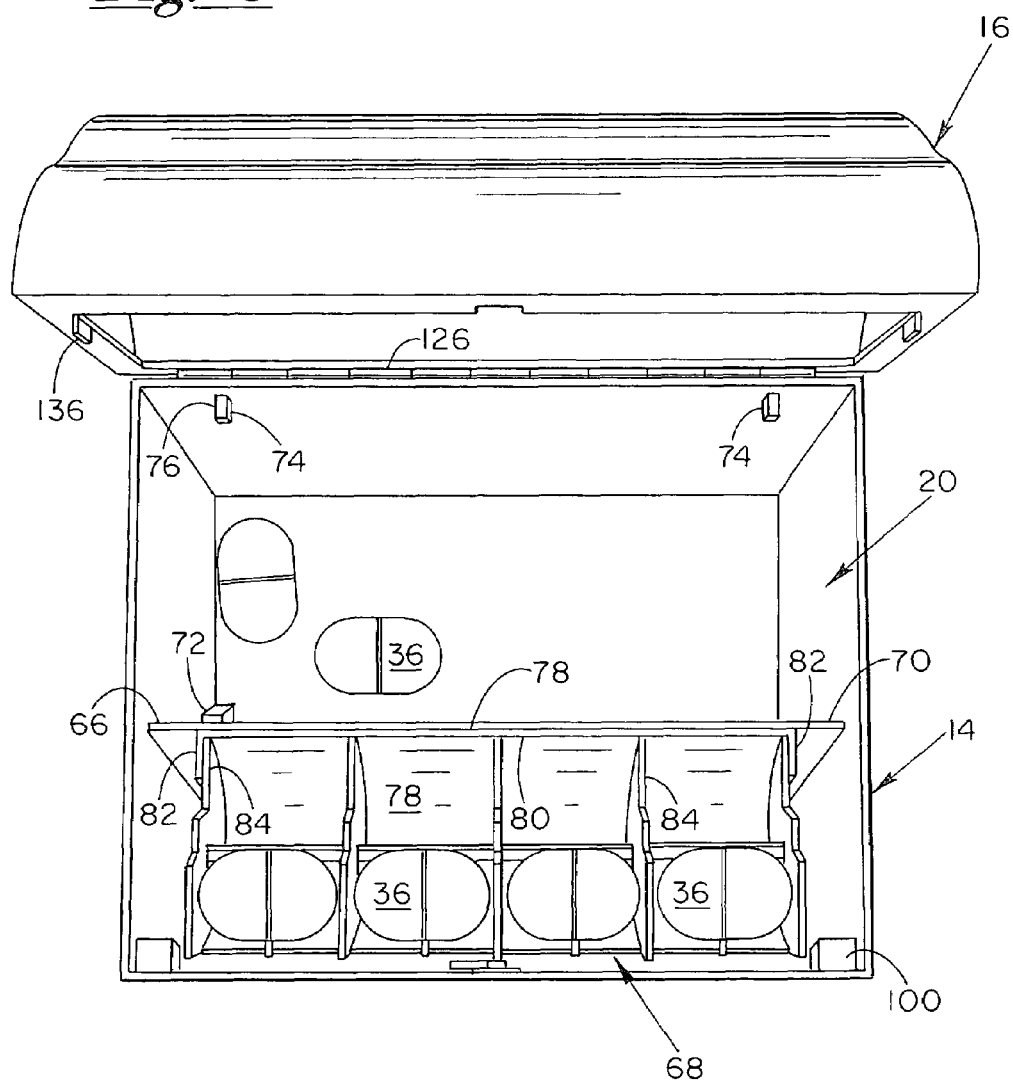
FIG. 8 is a top view of the apparatus of FIG. 1 with the lid of the apparatus in an open position and with a tray removed from the apparatus.
Figure 9:
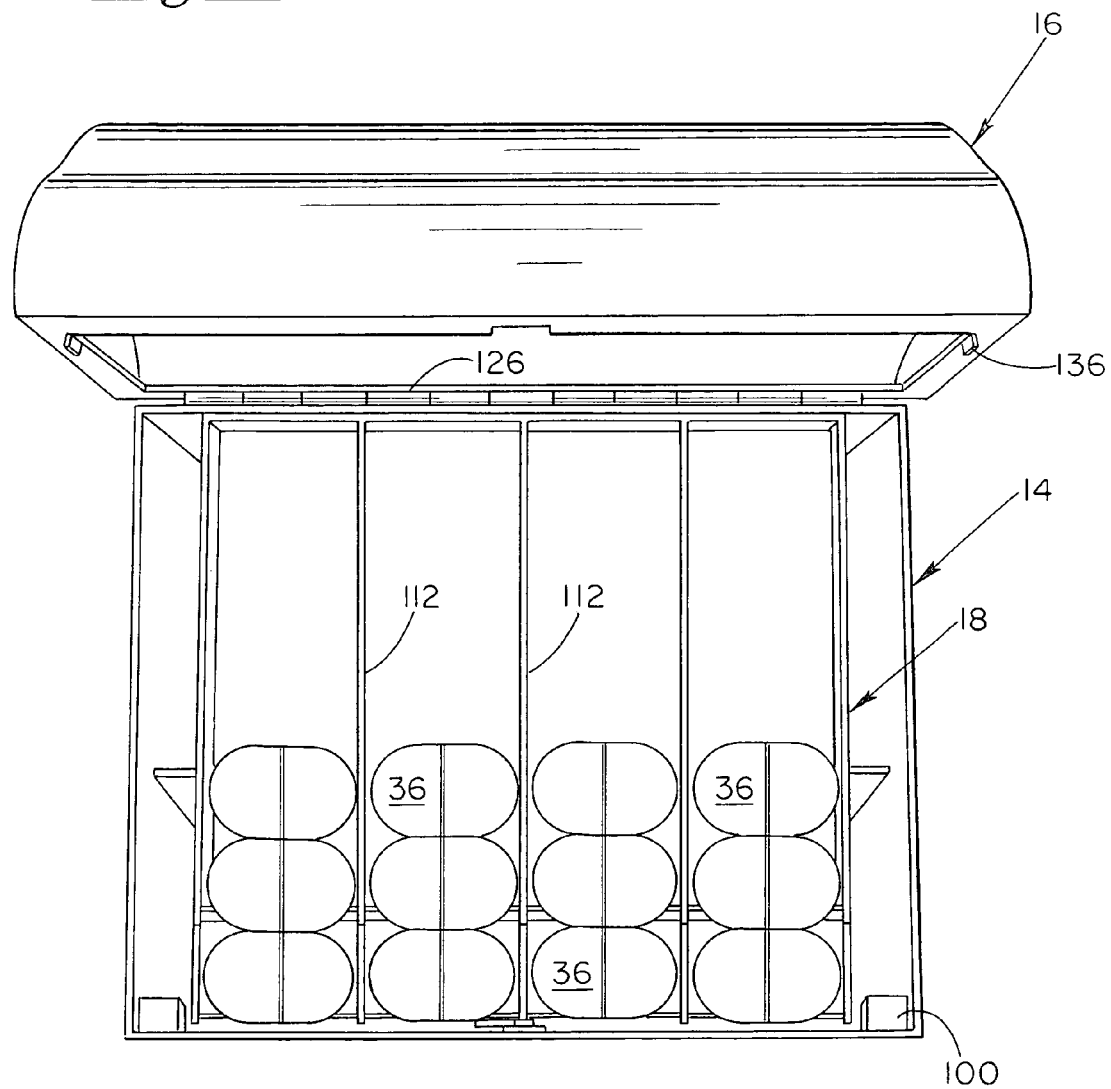
FIG. 9 is a top view of the apparatus of FIG. 1 with the lid of the apparatus in an open position and with a tray in place in the apparatus.
Figure 10:
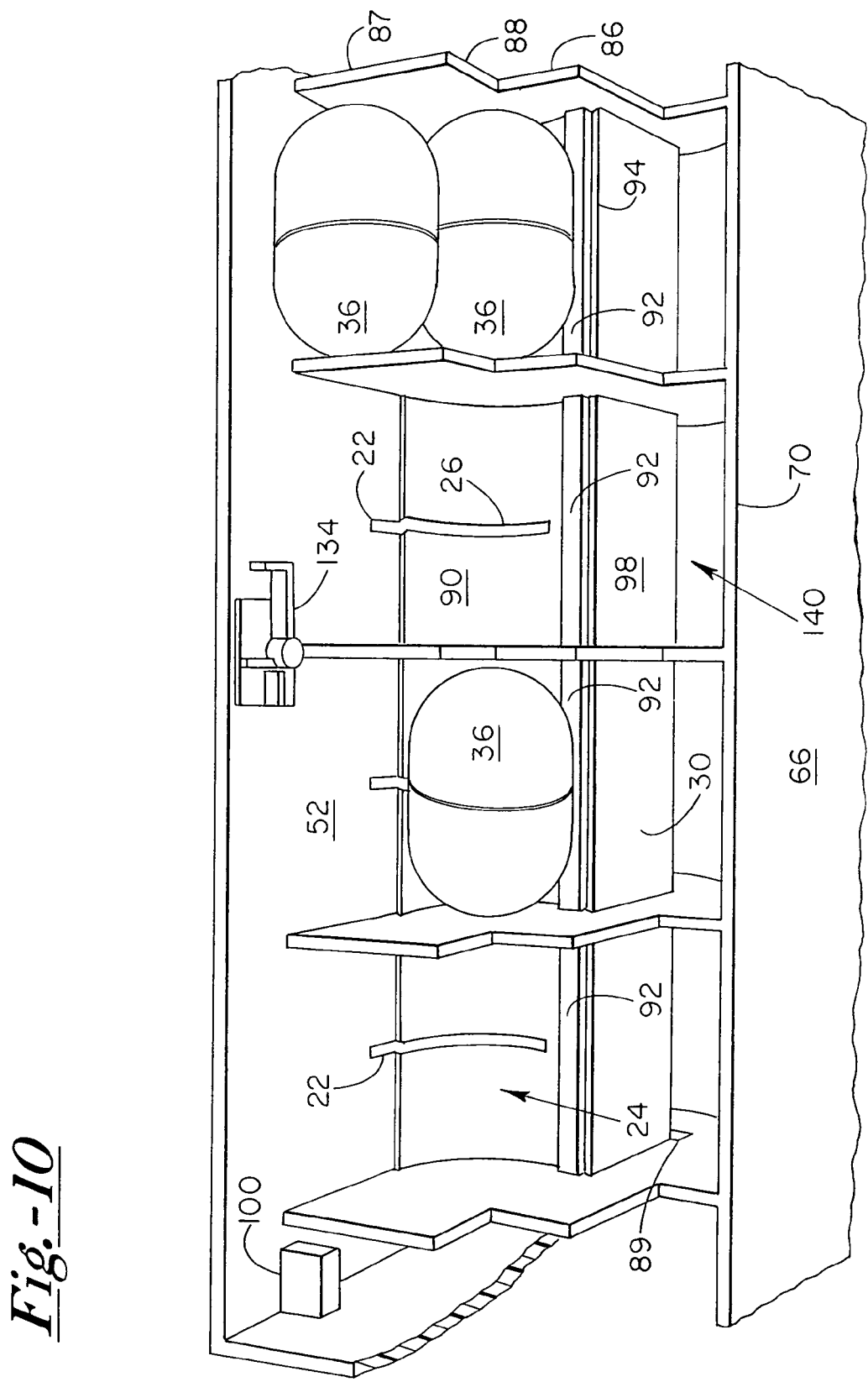
FIG. 10 is a detail view of a portion of the apparatus of FIG. 1 and shows, via a rear perspective, how containers sit in their seats and how a container may sit upon another container.
Figure 11:
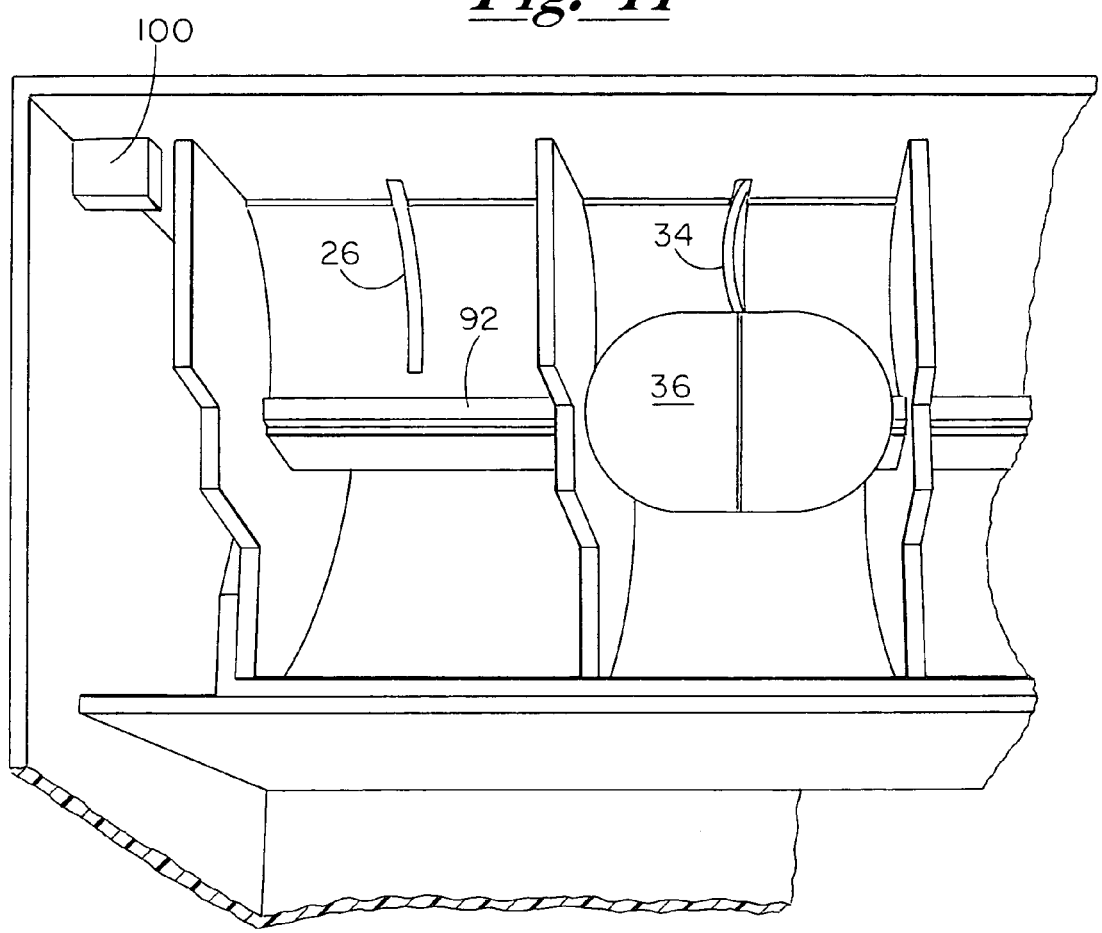
FIG. 11 is a detail view of a portion of the apparatus of FIG. 1 and shows, via a rear perspective, how a token may push a container off a seat.
Figure 12:
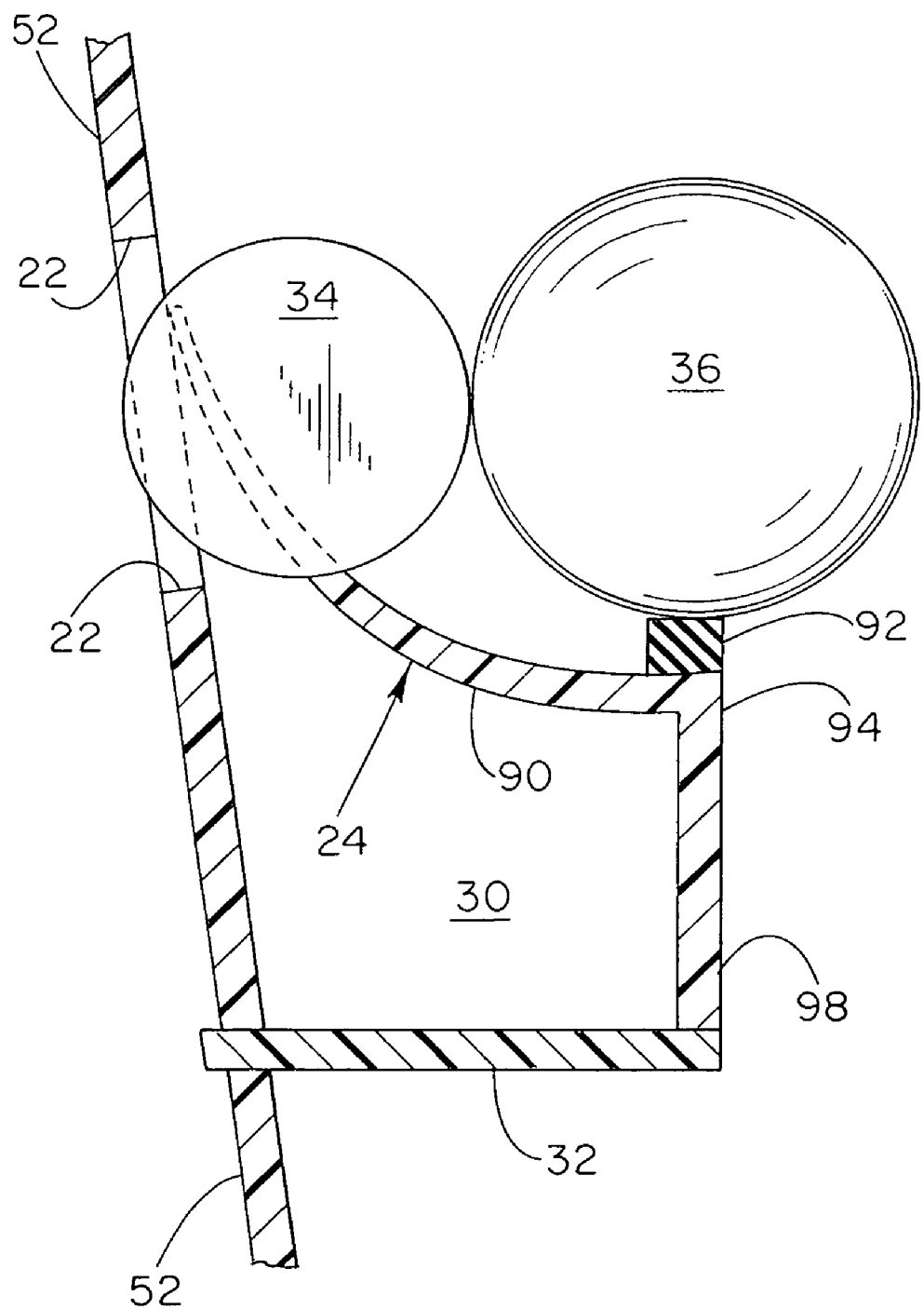
FIG. 12 is a diagrammatic section view of a portion of the apparatus of FIG. 1 and shows how a token is generally completely inserted beyond a point of no return so as to push a container beyond a point of no return.
Figure 13:
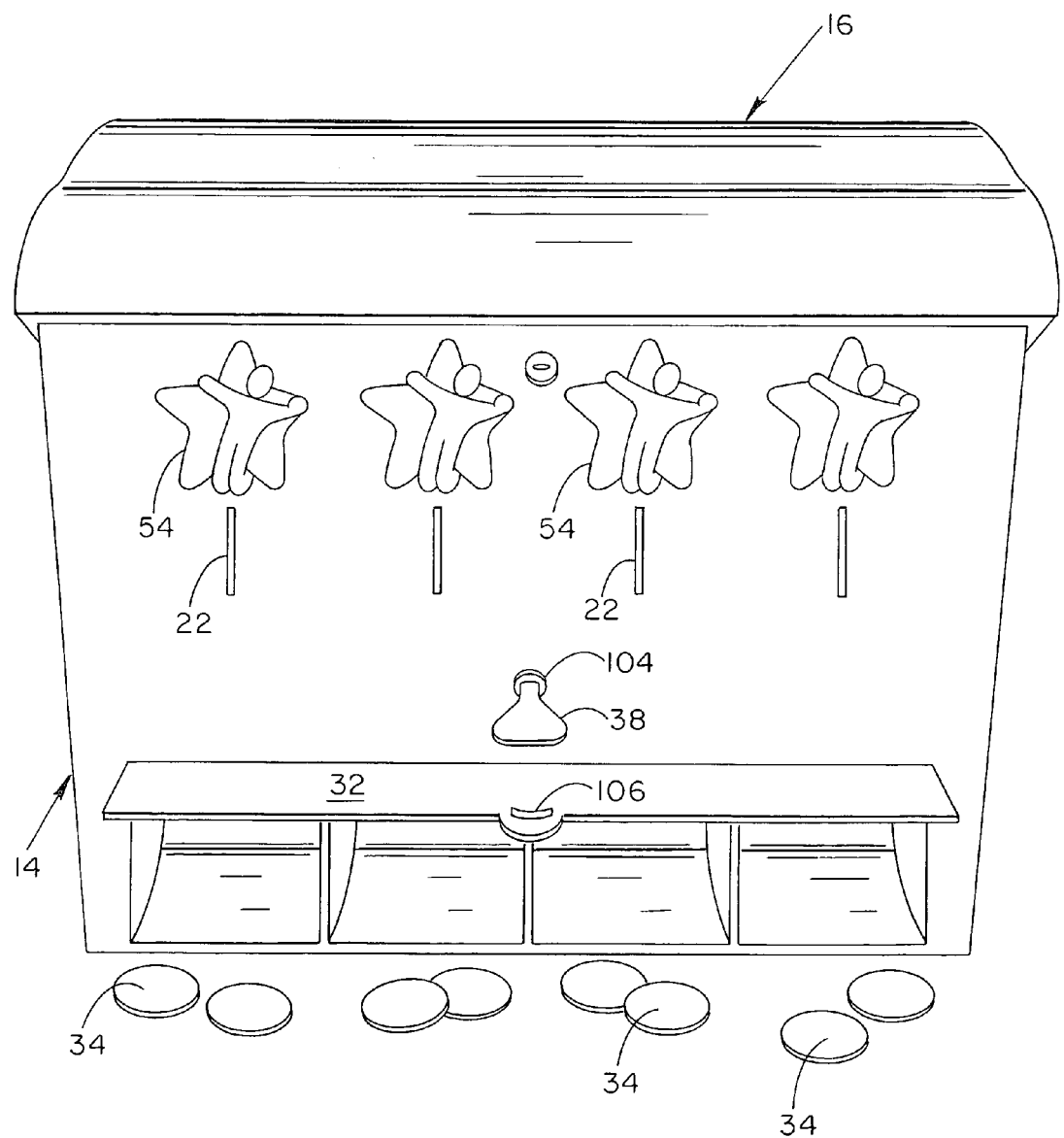
FIG. 13 is a front view of the apparatus of FIG. 1 and shows a slideable floor in an open position and tokens separated naturally into groups after the opening of the slideable floor.
Figure 14:
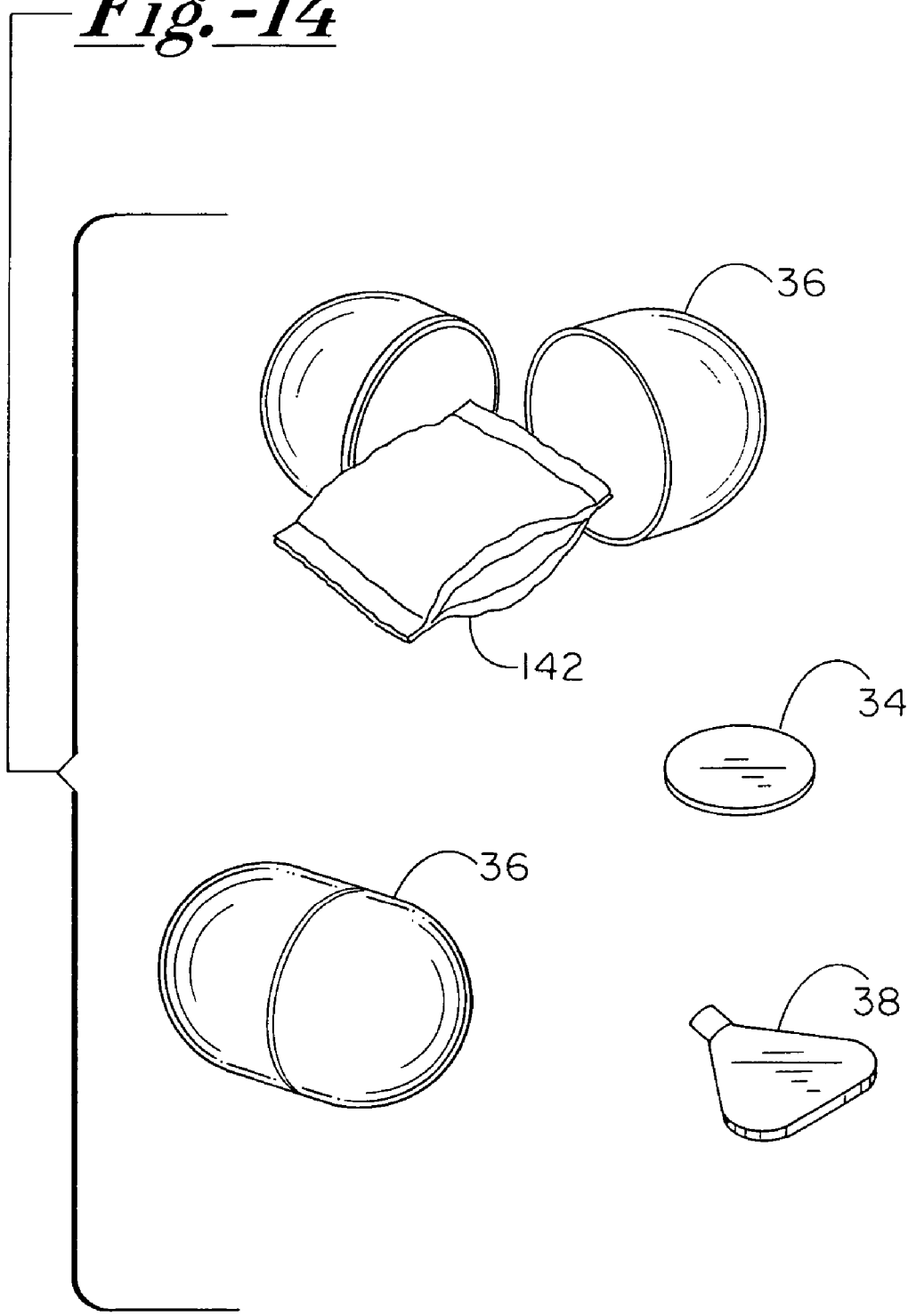
FIG. 14 shows a perspective view of an open container, a perspective view of a reward article, a perspective view of a closed container, a perspective view of a token, and a perspective view of a key for locking the slideable floor and for locking the lid.

As shown in FIG. 1, the present token receiving and article dispensing apparatus is indicated in general by reference number 10. Apparatus 10 generally includes a housing 12 having a body 14 and a lid 16, a feed or tray 18, a general storage area 20, a token inlet 22, an article rest or article dispenser or article ledge 24 having a token slot 26, an article and token outlet 28, a used token storage 30 having a slideable floor 32, a plurality of tokens 34, a plurality of articles or containers 36, and a key 38 for locking and unlocking each of the slideable floor 32 and lid 16.

Body 14 includes a floor 40 having a front cut out 42 such that floor 40 includes two forwardly protruding members 44. Floor 40 further includes a set of four feet 46 engaged to the underside of the floor 40 in the corners of the floor 40. Feet 46 for formed of a nonslip material such as an elastomeric or rubber material.

Body 14 further includes a pair of sidewalls 48 extending upwardly and outwardly of the floor 40 such that each of the sidewalls 48 extends at an oblique and obtuse angle relative to the floor 40. Each of the sidewalls 48 is trapezoidal in shape such that upper and lower sidewall edges are parallel to each other and the front and rear sidewall edges are oblique relative to each other and to each of the upper and lower sidewall edges.

Body 14 further includes a rear wall 50 extending upwardly and outwardly of the floor 40 such that rear wall 50 extends at an oblique and obtuse angle relative to the floor 40. Rear wall 50 is trapezoidal in shape such that upper and lower rear wall edges are parallel to each other and the side rear wall edges are oblique to each other and to each of the upper and lower rear wall edges. Rear wall 50 is engaged to the rear edges of sidewalls 48.

Body 14 further includes a front wall 52. Front wall 52 extends upwardly and outwardly of the floor 40 such that front wall 52 extends at an oblique and obtuse angle relative to the floor 40. Front wall 52 is generally trapezoidal in shape such that upper and lower edges or edge portions are parallel to each other and the side front wall edges are oblique to each other and to each of the upper and lower front wall edges or edge portions. Front wall 52 is engaged to the front edges of sidewalls 48.

Front wall 52 includes the token inlets 22. Each of the token inlets 22 extends vertically in the front wall 52, has a length slightly greater than a diameter of token 34, and has a width slightly greater than a width of token 34. With such a length and width, up and down movement and side to side movement of token 34 is minimized as token 34 is inserted into token inlet 22.

Front wall 52 further includes engaged thereon a set of four visual indicators 54. Each of the visual indicators 54 is positioned immediately above one respective token inlet 22. Preferably, the color of the visual indicator 54 is associated with a color of a token 34 and further associated with a color of an article or container 36. Alternatively, another unique feature of visual indicator 54, such as a shape thereof, may be associated with a like shape on a token 34, which in turn may be associated with a like shape of or on article or container 36.

Front wall 52 further includes the outlets 28 which are generally cut outs formed in front wall 52, a laterally or horizontally extending cutout 56 for slideable floor 32, a first circular cutout 58 for a keyhole 60 for controlling a sliding of floor 32, and a second circular cutout 62 for a keyhole 64 for controlling opening and closing of the lid 16.

Body 14 further includes an inner wall or divider 66 for dividing an inside of body 14 into the general storage area 20 and an article dispensing and token receiving area 68. Divider 66 is engaged to and extends upwardly from floor 40 via a straight lower divider edge. Divider 66 includes side divider edges extending obliquely and obtusely from the lower divider edge. Said side divider edges are engaged to the inner surfaces of sidewalls 48. An upper straight divider edge 70 terminates short of the upper edges of sidewalls 48 so as to provide one support for feed or tray 18. The connection among the divider 66, floor 40 and sidewalls 48 is buttressed via blocks 72 engaged to each of upperside of floor 40, rear side of divider 66, and inner sides of sidewalls 48. General storage area 20 is of a sufficient size to hold a plurality of tokens 34 and a plurality of articles 36.

Body 14 further includes a pair of feed or tray supports 74. Each of the tray supports 74 is a triangular piece having a rear edge engaged to the front side of rear wall 50 and an upper edge 76 for confronting and abutting an underside of feed or tray 18. Upper edge 76 is inclined relative to a plane in which floor 40 lies so as to position feed or tray 18 in a like inclined position relative to the plane in which floor 40 lies so as to bias articles or containers 36 in a downward direction toward article rests 24.

Body 14 further includes a chute base 78 that is a curved piece from an upper edge 80 to a lower edge 82. Upper edge 80 is engaged to the front side of divider 66. Lower edge 82 is engaged to the inner side of front wall 52. Lower portions of side edges of chute base 78 are engaged to inner edges of forwardly protruding members 44.

Body 14 further includes an end support piece 82 engaged to each of the ends of chute base 78. End support piece 82 extends vertically and is generally L-shaped. End support piece 82 includes a lower edge engaged to frontwardly protruding floor member 44, a rear edge engaged to the front side of divider 66, and a front edge engaged to the rear side of front wall 52.

Body 14 further includes a set of five chute and token partitions 84. Each of the partitions 84 extends generally vertically and includes a curved lower edge that engages the chute base 78 from chute base upper edge 80 to chute base lower edge 82. Each of the partitions 84 includes a front straight edge that engages the rear side of front wall 52, and an upper stepped edge. Upper stepped edge includes an inclined edge portion 86 for receiving and supporting an underside of tray 18 and an inclined edge portion 87 that serves as a sight line for aligning tray 18. Inclined edge portion 86 is parallel with upper edge 76 of tray support 74. Portion 86 and upper edge 76 lie in a plane that includes upper edge 70 of divider 66, all of which provide support for tray 18. Upper stepped edge of partition 84 further includes a stop or stop edge 88 for confronting and abutting front portions of tray 18. Partition 84 further includes a slot 89 for receiving and supporting slideable floor 32 of used token storage area 30.

Body 14 further includes the article rest or article dispenser or article ledge 24. Article rest 24 includes a seat or curved piece 90 engaged to and between a pair of partitions 84. A front portion of seat 90 is engaged to the rear side of front wall 52. Article rest 24 further includes a nonslip strip 92 extending along a rear edge 94 of seat 90. Strip 92 may be formed of an elastomeric or rubber or resilient material. Strip 92 performs a number of functions. When an article 36 falls from the article feed 18 to the article rest 24, strip 92 traps the article 36 on the seat 90. Further, strip 92 partially cushions the fall and minimizes any bouncing of article 36 upon seat 90, such as a bounce out of seat 90, onto chute base 78, and out of outlet 28. Further, strip 92 contributes to maintaining article 36 on seat 90 once the article 36 is on the seat 90, as the apparatus 10 may be carried from location to location with articles 36 engaged on seat 90. Still further, strip 92 is an adjustable control mechanism that controls exactly when article 36 falls off rear edge 94 of seat 90 when said article 36 is pushed by a token 34 being pushed into and through one token inlet 22. Strip 92 is in effect a portion of such rear edge 94, and strip 92 may have a relatively great height or a relatively low height, depending upon the diameter of the token 34 and the type and/or shape of article 36. The presence or absence of strip 92, and/or the selected width and/or height of strip 92, and/or the type of material from which strip 92 is formed, are factors included in a "tuning" of the timing of the fall of article 36 from article rest 24. Strip 94 may be permanently engaged to seat 90 or removably engaged thereupon.

It should be noted that a lowermost portion of seat 90 is positioned sufficiently rearwardly of the rear side or rear face of front wall 52 such that, when article 36 is positioned on seat 90, another article 36 may sit or rest on top of the seated (or first mentioned) article 36 where said another article 36 also rests against the rear face of front wall 52. In other words, the lowermost portion of seat 90 is spaced from the rear face of front wall 52 by a distance slightly greater than one half a longitudinal length of article 36.

Article rest 24 further includes the token slot 26 formed therein. Article rest 24 generally confronts and is adjacent to token inlet 22 and token slot 26 is aligned with and is in communication with token inlet 22. Token slot 26 runs from a front edge of seat 90 and runs rearwardly toward, and terminates short of, a rear edge of seat 90. A length of token slot 26 is slightly greater than a diameter of token 34 and a width of token slot 26 is slightly greater than a width of token 34 so as to minimize, respectively, any rearward travel of token 34 and any side to side movement of token 34. Over a certain period of time, token 34 is in only token inlet 22. Over a certain period of time, token 34 is in both of token inlet 22 and token slot 26. Over a certain period of time, token 34 is in only token slot 26. Token 34 travels transversely or longitudinally relative to article rest 24 and container 36.

Body 14 further includes seat support walls 98. An upper edge of seat support wall 98 is engaged to a lower rear end of seat 90. Side edges of seat support walls 98 are engaged to opposing faces of opposing partitions 84. A lower edge of seat support wall 98 terminates at slot 89 such that used token storage area 30 is formed by seat support wall 98, slideable floor 32, two opposing partitions 84, seat 90, and front wall 52.

Body 14 further includes upper and lower blocks 100 for buttressing the connection between front wall 52 and sidewalls 48.

Slideable or moveable floor or drawer or token dispenser 32 includes laterally extending pins or stops 102 for preventing floor 32 from sliding completely out of cutout or slot 56. Pins 102 protrude laterally from end rear portions of sides of floor 32 to abut the rear side or rear face of front wall 52. Slidable floor 32 further includes a lock 104 for engaging a recess 106 in floor 32. Slideable floor 32 further includes a handle or nub 108 that remains outside of body 14 when the slideable floor 40 is fully slid into body 14. When floor or drawer 32 is slid partially out of body 14, used token area 30 is in communication with a lower portion of chute 140 and outlet 28 such that tokens 34 out of used token storage area 30 and into the chute 140 and outlet 28.

Body 14 further includes, as a removable portion, tray or feed 18. Tray 18 includes a bottom piece 110 for engaging tray supports 74, upper divider edge 70, and edge 86. Mounted on the bottom piece 110 is a set of longitudinally extending rail pieces 112. Rail piece 112 extends beyond a front edge of bottom piece 110 and has a front portion with a bottom edge that is flush with the underside of bottom piece 110. Tray 18 further includes an end piece 114 mounted on the rear edge of bottom piece 110 and engaged to the rear edges of the rail pieces 112. Tray 18 further includes lateral stops 116 engaged to the outermost rail pieces 112 and extending beyond the underside of bottom piece 110. When the tray 18 is engaged on tray supports 74, upper divider edge 70, and edge 86, lateral stops 116 confront and about the outer faces of outermost partitions 84 for minimizing lateral movement of tray 18 in body 14. When engaged in body 14, tray 18 includes an upper portion adjacent to the end piece 114 and a lower portion adjacent to front edge of bottom piece 110. When engaged in body 14, tray 18 is inclined such that articles 36 are biased in the downward direction toward the front edge of bottom piece 110.

Housing 12 further includes the lid 16. Lid 16 includes an undulating ceiling 118 that undulates from front to back and includes a peak or apex 120. Lid 16 further includes side panels 122 that extend, from ceiling 118, outwardly and downwardly such that side panels 112 are disposed at an acute angle relative to floor 40 when the lid 16 is closed. Side panels 122 are engaged to end edges of ceiling 118. Lid 16 further includes a bottom rim 124 engaged to the bottom edges of side panels 122 and to the front and rear edges of undulating ceiling 118. When lid 16 is closed, rim 124 confronts and abuts the upper edges of sidewalls 48 and front wall 52 and confronts the upper edge of rear wall 50. Lid 16 is engaged to the rear wall 50 via a hinge 126 engaged to the rear face of rear wall 50 and the portion of the rim 124 confronting the upper edge of rear wall 50. In a fully open position, lid 16 comes to a rest when one portion of hinge 126 abuts another portion of hinge 126. At such a fully open position, rim 124 is generally at a right angle to the upper edges of sidewalls 48. Rim 124 further includes a cut out 130 formed in part by a longitudinally extending edge 132 that catches a latch of a lock 134 engaged to the front wall 52. Lid 16 further includes front lateral stops 136 extending beyond an underside of rim 124 for confronting inner faces of sidewalls 48 to minimize lateral movement of lid 16 relative to body 14.

From the structure recited above, it can be seen that the apparatus 10 includes individual compartments, where each of the compartments may be defined as including an individual elongate feed 138, an individual article rest 24, an individual elongate chute 140 and an individual used token storage area 30.

From the structure recited above, it can be seen that the apparatus includes a first set of four first paths for articles 36 and a second set of four second paths for the tokens 34, with the first and second paths intersecting twice. A first intersection occurs at seat 90, where token 34 pushes article 36 from seat 90. A second intersection occurs at the lower end of chutes 140 and outlets 28. Each of token 34 and article 36 runs down the lower end of chute 140 and passes through outlet 28 such that outlet 28 is a shared or common outlet.

From the structure recited above, it can be seen that the front edge of tray 18 is generally above article rest 24, which is generally above chute 140, which is generally above outlet 28 such that articles run automatically via gravity from the feed 18 to the article dispenser 24 to the article chute 138 to the outlet 28 and out of the apparatus 10. It can be further seen that token inlet 22 and the confronting article rest 24 and its token receptor or slot 26 are generally above token storage area 30, which is generally above a lower portion of chute 140, which is generally above outlet 28 such that tokens run automatically via gravity from the token inlet 22 to the token slot 26 to the used token area 30 to the outlet 28 and out of the apparatus 10.

From the structure recited above, it can be seen that the housing 12 takes a form that generally reflects the shape of a treasure chest. A treasure chest may take a shape where a body of the treasure chest includes two sidewalls, a front wall (or third sidewall), a rear wall (or fourth sidewall), and where each of the four sidewalls extends upwardly and outwardly from the floor. Further, a treasure chest may have a lid where the ceiling of the lid is in an undulating form or where the lid includes an upper undulating surface. Further, sidewalls of the lid of the treasure chest may taper downwardly and outwardly. Further, the lid of the treasure chest is lockable.

Apparatus 10 further includes a set of the tokens 34. Token 34 is preferably in the shape of a disk and is preferably of a color associated with visual indicator 54 and with article 36. Token 34 further preferably includes a visual indicator of a certain shape on one or more of its faces. For example, a face of token 34 may include the indicia "I APPECIATE YOU." The size of the diameter of token 34 is selected, in combination with the shape and size of seat 90, in combination with the width and height of strip 92, in combination with the size and shape of article 36, such that token 34 is almost fully extended into and beyond the front face of front wall 52 when article 36 falls off article rest 24 and into chute 140. Preferably, such a fall happens when the front face of front wall 52 is tangential to the circumference of token 34.

Apparatus 10 further includes a set of the articles or containers 36. Article 36 is preferably a container that can be opened and that holds an object, such as object 142.

Object 142 is a reward object such as a packet of candy or a small toy truck. Container 36 is preferably in a shape that rolls such that container 36, like water, can automatically seek a lower level and roll downhill. Container 36 may be in a cylindrical or elliptical shape, as shown, or in a round shape, or in some other shape that seeks a lower level under the influence of gravity. Container 36 is opened via two shell portions that frictionally engage each other. Container 36 is opaque so as to hide object 142 contained therein until the container 36 is opened.

Apparatus 10 further includes the key 38. Key 38 opens floor lock 104 via keyhole 60 and further opens lid lock 134 via keyhole 64.

In operation, one or more of containers 36 are charged (filled) with one or more of objects 142. Alternatively, if desired, one or more containers 36 may be maintained in an empty state, so as to carry predefined traits or traits similar to that of a wild card or traits similar to that of a "joker card" in a pack of playing cards.

Then containers 36 of a respective color (or of a respective visual indicator) are set in their respective individual feeds 138 such that said respective containers 36 ultimately roll out of respective outlets 28 immediately below, and thereby associated with, the respective token inlets 22 that are identified by their respective visual indicators 54.

Then one container 36 of each of the colors (or visual indicator) is set in its respective article rest 24. Then, preferably, a second container of the same color (or same visual indicator) is set upon the seated article 36 such that the second container also rests against the rear face of the front wall 52.

Then the tray 18, having the containers 36 loaded thereon, is set on its supports, i.e., the supports 74, upper divider edge 70, and edges 86 of the chute partitions 84. Tray 18 is further aligned with edges 87 and placed in abutment with edges 89 with lateral stops 116 confronting the outer faces of the outermost chute partitions 84. As the tray 18 is set in place, the containers 36 on the tray 18 run slightly downhill until the front most container 36 comes to rest on article rest 24, or until the front most container 36 comes to rest upon a second container 36 already upon article rest 24, or until the front most container comes to rest against said second container 36.

Then the lid 16 is closed and the lock 134 operated to lock the lid 16 to the body 14.

Then a first person notices positive behavior of a second person. The first person then gives to the second person a token associated with the second person. Preferably, all of the tokens are available to all of the other persons at all times such that an honor system is in place, with a token becoming "live" (or available for use) only when a nonsecond person, such as the first person, gives said token to said second person. However, if desired, the tokens may be kept in a secure place accessible only to a certain person or persons such as a parent or parents or child or siblings, whereby a mother may keep tokens for her children and whereby a child may keep tokens for her mother.

Then the second person inserts the live token 34 in the token inlet 22 associated with the second person. The second person preferably cannot operate dispenser 24 (or article rest 24) by clinging to the faces of token 34. The second person preferably must push token 34 into token inlet 22 by the edge (rim) of token 34, with a container 36 falling off article rest 24 only when the last remaining portion of token edge 34 is pushed into token inlet 22. At such a time, container 36 is pushed by the other edge of token 34 beyond a point of no return and falls into its individual chute 140, rolls down individual chute 140, and out of outlet 28. The second person then may open container 36 to receive her reward object 142.

Immediately after the token 34 pushes container 36 off of article rest 24, or substantially simultaneously with the token pushing container 36 off of article rest 24, token 34, which at such a point in time is partially in token slot 26, drops through token slot 26, into used token storage area 30, and onto the slideable floor or drawer 32 of the used token storage area 30.

As the container 36 falls off article rest 24, the next immediate container 36 drops onto article rest 24 and the remaining containers 36 situated upstream roll downwardly to take the place just vacated by its forwardly placed neighbor. Such path of containers 36 is thus ready for a subsequent operation.

At some point in time, slideable floor or drawer 32 is unlocked via lock 104. Then floor or drawer 32 is slid out. Used tokens 34, as the floor or drawer 32 is slid out, may abut the rear face of front wall 52 and be driven off the rear edge of floor or drawer 32, fall out onto a lower portion of chute 138 and slide out of chute 138 and out of outlet 28. Tokens 34 thereby automatically slide themselves into separated groups onto the surface upon which the housing 12 rests. Tokens 34 of one color (or visual indicator) are thus not mixed in with tokens of another or further colors (or visual indicators). Floor or drawer 32 is then slid back in and locked via lock 104. Apparatus 10 is thus ready for a subsequent operation.

It should be noted that the housing 12 may take alternate forms. One such form is a three-dimensional smiley face, such as in the shape of a three-dimensional oversized disk having the general shape of an oversized hockey puck, where the smiley face is placed on one of the faces of the disk and with token inlets 22 placed on the face of the disk having graphics of two eyes and a large smile. Another such form is the shape of a racing car.

It should be noted that, when the housing 12 is in the form of a treasure chest, the colors on the outside of housing 12, and the colors of the tokens 34, articles 36, visual indicator 54, and the colors of the reward objects 142 are preferably metallic colors.

It should be noted that the present method for recognizing and reinforcing positive behavior is not a bribery method. In a bribery method, the step of giving money comes first in time and the positive behavior comes second in time. With the present method, positive behavior comes first in time and the step of giving a token comes second in time.

One method of the present invention includes generally the following four steps: 1) having a first person recognize positive behavior of a second person; 2) having the first person give a first thing to the second person; 3) having the second person put the first thing into a second thing; and 4) having the second thing automatically output a third thing. The first thing may be a token, coin, paper bill or other thing or three-dimensional object that can be put into the second thing to trigger the release of the third thing. Or the first thing may be a password to access a certain television or movie channel or password to access a certain website or password to begin the operation of a computer game. Or such password or thing that is not a three dimensional object may be written down upon the third thing. The second thing may be a three dimensional object or software or set of directions that recognizes the first thing and releases the third thing in response to the first thing. The third thing is generally in the nature of a reward, whether the third thing is a three-dimensional object or other type of reward.

II. The Method for Using the Token Receiving and Article Dispensing Apparatus The present method is a guide to promoting, teaching and displaying appreciation.

II.A. HYPOTHETICAL EXAMPLE 1

Yesterday morning was business as usual. Wake-up calls, showers, dressing, breakfast, making lunches are all requisites of each and every weekday morning for many of us.

I drove my daughter the fifteen miles to her school and we chatted about the day's activities. We arrived at her school, parked, and she grabbed her belongings from the car. "Oh, no. I forgot my science report. I left it next to the computer. Mom, it's due today. Can you go back home and get it, please?" she asked in a woe-is-me kind of way.

I sit there for a moment. I'm due at work in 20 minutes. I considered my options. She worked hard on that report and, generally, she goes the extra mile in so many ways. I tell myself that I'll work through my lunch and go home now and retrieve her paper.

"Alright, I'll run home, get your paper and leave it at the school's office. You can pick it up there before your science class. Have a good day," I say as I give her a quick hug and we part ways, each of us heading off to start our busy day.

II.B. The Step of Teaching Others to Behave by What We Reinforce

Does the above scenario (example) sound at all familiar? Things like this happen in our lives on a daily basis. We constantly do little, and big, things every day for one another. We don't expect anything in return. We do these things because we care. However, can any of us say that sometimes we don't feel just a little resentful of the things we are asked, or expected to do? Add these feelings to the fact that our patience, time and finances are also stretched. And what about the second-guessing? Maybe I shouldn't go and get it for her. Maybe this should be one of those life lessons. It's no wonder we often feel depleted and overwhelmed!

Every day is a balancing act of work, play, kids, mates, tasks, and bills (I am sure you can add a few items of your own on to this list). Now, more than ever, we want our home to be our safe haven, our resting spot. Yet, sometimes, it is anything but. Time, energy, and resources are stretched thin and also, is our patience. As parents, our frustration levels seem to be at an all time high. How can we create a home that is nurturing and restorative . . . a place where every member can come together at any given time and genuinely enjoy the comforts of one another?

Recent research indicates that the most significant factor in how things work out for children is their relationship with their parents. Each and every day parents are setting standards of behavior for their children. Parents are the role models from which their children take what they have learned inside the home out into the world. So, to answer the question "How can we create a home that is nurturing and restorative?" - - - BE A GOOD AND INVOLVED TEACHER. All behavior is taught. Consider this . . . We all struggle to do the best we can with the resources at hand. However, due to the busy(ness) of our lives, we often end up encouraging the very behaviors we wish to stop. Keep in mind that WE TEACH OTHERS TO BEHAVE BY WHAT WE REINFORCE.

II.C HYPOTHETICAL EXAMPLE 2

You've just walked in the door with your 7 and 9 year old sons. It's been a long day at work and now it's time to start dinner. Your husband comes in and you can tell by the way he closed the door that the day has been a long one for him, as well. You hear the kids beginning to argue in the family room about what television show to have on.

"Stop it or you'll both go to your rooms. I have to get dinner started. Don't make me come in there," you shout from the kitchen.

You have a few words with your husband and you start dinner as he begins to go through the mail. By now, the kids are having a free-for-all and one begins to cry. "Ow, that hurt. Mom he hit me. Mom, I want to watch . . ." one of the boys yells from the family room.

"That's it. Here we go again," you mumble to yourself as you leave the kitchen and head to the family room. "Alright, you two. Enough is enough. No TV for either of you. Both of you go to your rooms right now. Come on. Now," you say as you steer each to their room.

II.D. The Step of Looking Actively for and Then Openly Appreciating Positive Behaviors, Actions, and Words We have all had similar scenarios such as example 2 played out in our own homes. Guess what? The kids got mom's attention. Okay, so it was negative attention for a negative behavior. However, they did what they had to do to get mom to SEE them. If the kids hadn't been arguing and fighting, they would have been ignored until they were called for dinner. So, good behavior ignored, bad behavior rewarded (with mom's attention). It is too easy to take good and positive behavior for granted. It's as if we see good behavior as a reprieve or a respite where we can save our energies for the times we will be called upon to address negative behaviors that come up. But, as we see, this way of thinking is in error. Mom inadvertently encouraged the very behavior she was hoping to avoid. Remember, WE TEACH OTHERS TO BEHAVE BY WHAT WE REINFORCE.

What if we began to look actively for and then openly appreciate positive behaviors, actions, and words in an effort to change this trend of rewarding negative behavior and punishing/neglecting good behavior. Let's see how the previous scenario might look if mom decided to utilize this tactic.

II.E. HYPOTHETICAL EXAMPLE 3

As soon as everyone is in the door, Mom says, "Hey, How about you guys helping me with dinner. You can set the table and you can start chopping the veggies. I would really appreciate your help and we can talk about each other's day while we're working."

This scenario (example 3) is of a win-win nature. It's not about one person emerging victorious and another going down in defeat. Mom is involved with her kids and they love it. They know they are helping with an important task and that their help is appreciated. Children included this way begin to become more aware and more appreciative of their own strengths and abilities. Appreciation becomes a motivator for kids to become more cooperative.

II.F. Using the Apparatus 10 with the Present Method Using the Apparatus 10 in Your Home Can be a Valuable Tool for Helping Families to Help Themselves After dinner was enjoyed and the table was cleared in example 3 Mom demonstrated her appreciation for the boys' positive engagement in the family's evening activities. "I really appreciate the way you both came in from school and jumped right in to help get dinner prepared. Wasn't it fun when we talked about the 'goofiest thing that happened to me today was . . . ' Anyway, I just enjoyed our time together. Here is an Appreciation token (token 34) for each of you to take to the Appreciation Station (apparatus 10)."

Words of praise followed by something special becomes a reinforcer for the preceding behavior. Using positive reinforcers successfully teaches kids what they need to learn to make day-to-day living easier and more comfortable for them, as well as the entire family. Teaching, rewarding, and displaying appreciation becomes an integral part of being a good and attentive teacher. The Appreciation Station (apparatus 10) is a tool that can help families build a positive structure of helpful, responsible, cooperative and healthy behavior in the home. These traits will be transferred to the outside world as family members see the value of teaching, rewarding, and displaying appreciation.

Counselors spend years learning, through formal training and hands-on experience, how to become a Professional Change Agent. Individuals, couples, and families in crisis seek help from counselors because something in their lives needs to change. As Agents of Change, a counselor learns early on specific skills necessary to communicate appreciation, validation, and acceptance for her clients. It is crucial for her clients to feel this before they feel "safe" enough to begin to open up, share, heal, and change. Yes, of course, there are special circumstances and situations where a Professional Change Agent's services and expertise might be required, but the truth of the matter is that we all (counselors and noncounselors alike) possess the ability to become Agents of Change. And for children, as we have already noted, the most significant Agent of Change in their lives is their parent(s). (Please note that this term is all-encompassing when used here. In society today parents are varied. We are talking about the main caretaker for the child. The parent is that person in the child's life that is there as caretaker, teacher, and nurturer.) We can learn to demonstrate, through our words and actions, feelings of acceptance and appreciation toward one another. It is one thing for us to say we appreciate each other; it is another to make sure that that appreciation is known and felt. Using the Appreciation Station (apparatus 10) in your home can be a valuable tool for families to begin to positively connect with one another, their community, and the world.

II.G. HYPOTHETICAL EXAMPLE 4

After much frustration with the toilet-training process, Martin, a father of two, decided to use the Appreciation Station (apparatus 10) in his home. Ryan, who was 3 at the time was an active little guy who seemingly had little to no interest in using the toilet on a regular basis. Martin called Ryan into the living room and asked him to sit on the sofa. Across from the sofa on the coffee table, Martin had placed the Appreciation Station (apparatus 10) there a few days ago and he and the children had talked about how they might begin to have fun with and utilize the Station (apparatus 10). The kids had been intrigued with their Dad's excitement and information on rewards and coupons and tokens.

"Ryan," Martin began, "I've been thinking about how hard it must be for an active little guy like yourself to learn how to use the toilet. It seems like sometimes you're having so much fun playing that you don't even notice when you have to 'go' (all families have their own verbiage for a trip to the bathroom)."

Ryan looked up at Martin and seemed to be saying, "This is not where I want to be or anything that I want to talk about," but he sat quietly.

Martin continued, "I'll bet when you're playing and having so much fun it's hard to stop what you're doing, run to the bathroom and climb up on to the toilet. You know, I know that the toilet is a bit high, that's because it's for adults, too. But what if, say, we put a little step stool there next to it just for you. That way it would be much easier for you to climb right up."

Ryan looked up with the cutest "that sounds like fun" smile and said "Yes, and at my school my friend has big boy pants and I like them."

Martin said, "It sounds like you've given this some thought. I really appreciate your ideas. What if we see if the Appreciation Station could be used to help us, too. When you have to 'go' and you are able to stop yourself from playing, travel to the bathroom and climb onto the toilet and 'use it' you can let me know. I'll appreciate your effort with an Appreciation token that you can then take to the Appreciation Station for a special reward put in there just for you. Does that sound like a plan?"

"Yes" Ryan said enthusiastically.

"Okay. We'll start tomorrow. I'll have the step stool in place and big boy pants in your drawer. Remember our motto "Assume success", Martin knew the kids loved that whenever he said it.

Two months later, Martin reported that Ryan was quite proud of himself. Ryan was enthusiastic from the beginning, very intrigued with discovering what was waiting for him in the Appreciation Station. "Dad, I made it to the bathroom," Ryan would rush to tell Martin.

"Ryan, I really appreciate that you were able to do that. Here is a token," Martin would say. Ryan would race over to the station, put in his token and out would come a special coupon or reward. In the beginning, he would let Martin know every time he made a trip to the bathroom. As time went on, Ryan began to 'do his business' and get right back to his playing, maybe only letting me know of his progress once every other day. At one point, nearly a week went by with no accidents and no reports to Martin either. Martin thought about this and decided an unprompted token of appreciation was in order. "Ryan, I really appreciate the fact that you were able to learn to use the toilet all by yourself. I'm very proud of you. Here is a token," Martin said as he gave his son a big hug and thought to himself "I think he's pretty proud of himself, too".

II.H. Putting the Method and Apparatus 10 into Use

LET THE APPRECIATION BEGIN! Look at your Appreciation Station (apparatus 10). Your family's very own treasure chest. Think of this treasure chest as a metaphor for the family. WITHIN THIS TREASURE CHEST ARE RICHES JUST WAITING TO BE ENJOYED BY THE FAMILY. A wealth of affirmation, appreciation, and love lies within the chest ready to enrich everyone's lives. Feeling loved and connected, valued and appreciated children learn to become effective people, Agents of Change in their own right. When their best is being appreciated children can begin to feel increasingly better about themselves and their ability to cope with life's challenges. They can learn to make good decisions, reason clearly about choices, manage time wisely and problem solve. All of this can happen because you are a good teacher and an Agent of Change and soon your kids will become good teachers, too.

Appropriate to each child's age and level of ability talk as a family about making the Appreciation Station (apparatus 10) an integral part of your home and family life.

Where shall the Appreciation Station (apparatus 10) be placed? We recommend a high-profile area where it can be a reminder to everyone that the family values what it stands for . . . APPRECIATION. How about the coffee table in the living room or an open shelf in the family room or kitchen? It has been our experience that it is too easy to "forget" if it is tucked away in a drawer or closet. When the Appreciation Station (apparatus 10) is visible to all it is a constant reminder that the family values appreciating positive behaviors, words, and attitudes.

What's inside the chest? Open the lid 16. There are four compartments, where each of the compartments may be defined as an individual feed 138, an individual article rest 24, an individual chute 140, an individual outlet 28, an individual token inlet 22, and an individual used token storage area 30. Each compartment holds preferably seven containers 36 that will be filled with rewards 142. Look at your Appreciation Station's (apparatus 10) colored tokens 34. Each colored token 34 is inserted into the corresponding color slot 22 on the chest. Family members can decide which color is "their color". Next, each person may consider what "reward" they will place in the treasure chest for the others to receive. For example, Martin may place his daughter's rewards in one compartment, his son, Ryan's rewards in another compartment, and his daughter and Ryan together may fill Martin's compartment with rewards they think he would like. This leaves one compartment that the family may use creatively to appreciate some aspect of their family life that they have decided would be significant. Remember, we see the Appreciation Station (apparatus 10) as a tool that can help families to arrive at their own solutions to their own unique situations.

What kind of rewards can the Appreciation Station (apparatus 10) accommodate? This is the fun part as each family member considers what 'rewards' they will place in the treasure chest for one another. Some examples of rewards follow. Coupons for special times/activities with one another. Examples of some coupons can be found below. Coupons to do specific tasks for one another. A rolled-up dollar bill (for the future accountants). Small age-appropriate items such as charms, key rings, toys, jewelry, etc. Certificates for larger or grander items that just might be fun to place in the Station every once in a while.

When do we know when it's a good time to give someone a token? Talk as a family about examples of when a trip to the Appreciation Station (apparatus 10) might be in order. Go back to the story (hypothetical example 1) of the mom who's daughter forgot her paper. Upon returning from school, the daughter goes to her room and takes one of the Appreciation tokens 34 she has for her mom and gives it to her mom, saying, "Mom, I really appreciate the fact that you took time out of your schedule to go and get my paper and bring it to my school. It meant a lot to me." Mom is feeling validated and appreciated (daughter can't help but feel good, as well) as she accepts the token 34 and takes it to the Station (apparatus 10). She inserts the token 34 into her colored slot 22 and receives a reward 142. In this case, a coupon placed inside the chest earlier in the week by her daughter. It read, "Good for a meal cooked by me whenever you present this coupon." How fun! The positive feelings generated by this interaction can transcend both individuals and begin enhancing and enriching the entire atmosphere of the family.

Remember, appreciate the behavior/attitude not the child. Words of praise followed by something special becomes a reinforcer for the preceding behavior. The child learns to do what is reinforced and will soon become adept at appreciating and rewarding your good behavior, as well. In the beginning, appreciate and reward immediately. As change becomes evident, rewards can become more unpredictable and intermittent.

Begin to notice when one helps out, cooperates, tries hard, takes responsibility, or succeeds and let each other know you noticed. For example:

I appreciate that you took your dirty clothes to the laundry room without being reminded. Thank you. Here is a token to take to the Station.

I appreciate how you used manners and introduced your new friend to your Grandfather. Thank you. Here is a token to take to the Station.

I appreciate how much effort you put into that project. I'd like to offer you a token of my appreciation.

I appreciate the way you included your brother in the game you were playing with your friends. Here is an Appreciation token you can take to the Station.

Mom, I appreciate that you ironed my uniform for me. Thank you. Here is a token for you.

There are countless opportunities to notice and appreciate the efforts and actions of those around us. Your being a good and attentive teacher for your children will, in the end, help them become people who will one day do as they should and behave as they ought, even when you're not there. They will take the standards you have set for them in the home out into the world where they can make positive changes for themselves and others. The Appreciation Station (apparatus 10) is a tool for the family to use in its desire to become a safe, loving, and healthy environment for each and every member. And let us not forget another very important component for families . . . to have FUN together!

In the experience of a professional, as well as in the personal experience of many, those families that work and play together as a team report the greatest sense of security, stability, satisfaction and well-being. The very act of sitting down as a family and looking over the Appreciation Station (apparatus 10) will send a huge message to the children. Your enthusiasm will easily transfer to them. As you can see, the possibilities are endless and fun! So, put your love and appreciation into action on a regular basis and be prepared to reap the riches!

II.I. Example of a Coupon as a Reward Objects 142

I Appreciate You. This coupon is good for (blank space to be filled in prior to being inserted into container 36, which is then placed into the appropriate individual feed 138). A person may write into the blank space "one sleepover for a friend" or "a homemade malt" or some other type of reward.

What is claimed is:

1. A teaching and reinforcing method for teaching and reinforcing positive behavior with a teaching apparatus, wherein the teaching apparatus comprises a) a first path along which articles are fed and dispensed; and b) a second path along which tokens are fed and dispensed, with the paths directly intersecting at least once, with the teaching and reinforcing method comprising the steps of:

selecting a reward article and feeding the reward article into said first path;

selecting a token associated with the second path;

making said token available to at least a first person;

having the first person notice positive behavior of a second person and then having the first person give to the second person said token; and then having the second person feed said token into said second path such that said reward article is dispensed by the teaching apparatus.

* * * * *